United States Patent [19]

Naqwi et al.

[11] Patent Number: 5,453,837
[45] Date of Patent: Sep. 26, 1995

[54] INTERFEROMETRIC DEVICE FOR DETERMINING SIZES AND PROPERTIES OF CYLINDRICAL OBJECTS BASED ON PHASE SHIFT MEASUREMENTS

[75] Inventors: Amir A. Naqwi, Shoreview; Leslie M. Jenson, Vadnais Heights, both of Minn.

[73] Assignee: TSI Incorporated, St. Paul, Minn.

[21] Appl. No.: 289,420

[22] Filed: Aug. 12, 1994

Related U.S. Application Data

[63] Continuation-in-part of Ser. No. 93,812, Jul. 19, 1993.
[51] Int. Cl.[6] .................................................. G01B 9/02
[52] U.S. Cl. ........................ 356/357; 356/349; 356/345; 356/361
[58] Field of Search ............................... 356/357, 355, 356/349, 345, 361, 343, 128, 73.1

[56] References Cited

U.S. PATENT DOCUMENTS 3,953,128  4/1976  Holly ........................ 356/357
4,986,659  1/1991  Bachalo ..................... 356/343

Primary Examiner—Samuel A. Turner
Assistant Examiner—Amanda Park
Attorney, Agent, or Firm—Frederick W. Niebuhr; Haugen and Nikolai

[57] ABSTRACT

A system for measuring cross sectional diameters of optical fibers and other elongate cylindrical objects includes a transmitting optics module for generating two collimated laser beams, and causing the beams to intersect and interfere with one another over a measurement region. The optical fiber under inspection is caused to intersect the measurement region with its longitudinal axis perpendicular to a plane defined by the laser beams. Several photodetectors collect light scattered by the optical fiber, and generate signals indicating fiber diameter based on phase differences in the scattered light received by the detectors. The system can determine fiber refractive index by using three detectors to obtain two phase shifts. Differences in Doppler frequencies also are sensed by the detectors, for determining transverse velocity components.

16 Claims, 9 Drawing Sheets

INTERFEROMETRIC DEVICE FOR DETERMINING SIZES AND PROPERTIES OF CYLINDRICAL OBJECTS BASED ON PHASE SHIFT MEASUREMENTS

REFERENCE TO PRIOR APPLICATION

This application is a continuation-in-part of U.S. patent application Ser. No. 08/093,812 entitled "Interferometric Cylinder Sizing and Velocimetry Device", filed Jul. 19, 1993.

BACKGROUND OF THE INVENTION

The present invention relates to non-contact optical sensors, and more particularly non-imaging interferometric devices for characterizing objects, in terms of determining time dependent and time independent dimensions.

Devices capable of measuring the cross sectional dimensions of narrow, elongate objects are useful in many scientific and technological applications. For example, in the manufacture of fibers (including optical fibers) and wires, typically by drawing processes, sensors are employed to monitor fiber and wire diameters.

Several types of these sensors are presently used in the fiber optics industry. In one approach, detector arrays image the fiber. In another, a focused laser beam scans the fiber. Both techniques have relatively slow response times, in that a measurement typically requires at least one tenth of a second. Given the high speed at which fibers are moved in many drawing processes (e.g. 10–100 meters per second), the diameter measurement must be averaged over several meters of fiber length. As a result, defects in the optical fibers are sensed only if they are sufficiently severe to substantially alter the fiber dimension, or if they occur over a considerable length of the fiber. Less severe, localized defects are not detected.

According to a third known technique, coherent light is directed onto the fiber in a manner that causes the fiber to produce a diffraction pattern. This approach affords more rapid measurement to facilitate detection of localized defects. However, its sensitivity is low. For example, an optical fiber having a diameter of 125 microns typically can be measured with a resolution of about 1 micron, at best.

Laser phase Doppler systems are known for their utility in measuring instantaneous velocities and diameters of fine particles in two-phase flows, e.g. liquid sprays. In a conventional phase Doppler apparatus, two spatially separated laser beams are caused to intersect one another, where they interfere with one another to create a measuring volume. The measuring volume is so small that usually only one particle crosses it at a time. Several photodetectors receive light scattered by particles passing through the measuring volume. The photodetectors are spaced apart from one another in a scattering plane, typically perpendicular to the plane formed by the laser beams. Differences in phase can be used to determine particle size, while heterodyne Doppler frequency is employed to determine particle velocity.

Particles, especially spherical particles, tend to scatter light in all directions and thus lend themselves well to analysis by laser Doppler systems. Elongate cylinders, by contrast, tend to scatter light over more restricted regions. More particularly, a cylinder arranged with its longitudinal axis perpendicular to the plane defined by the pair of laser beams tends to scatter light in the form of a thin sheet lying within the beam plane. Thus, conventionally arranged photodetectors are not well positioned for characterizing the cylinder.

As disclosed in the aforementioned application, high speed and accuracy are achieved by detecting, at two different locations, laser energy scattered by the fiber. However, certain manufacturing processes and conditions present challenges in this regard. For example, the phase difference (phase shift) measurement depends upon the fiber refractive index as well as the fiber diameter. The most common cause for a change in refractive index is a change in temperature, although the refractive index also is influenced by a change in material composition. A change in refractive index, if undetected, can lead to an erroneous conclusion as to fiber diameter.

Therefore, it is an object of the present invention to provide a fiber diameter measurement system incorporating correction for changes in the fiber refractive index and enhanced measurement accuracy through combining two separate measurements of object diameter.

A further object is to provide a system for combining phase shift readings to more accurately measure cross sectional dimensions of cylindrical objects.

Yet another object is to provide a means for measuring fibers, wires and other elongated cylindrical members as they are being manufactured, in a manner that avoids contact with the objects yet provides accurate and real time information to substantially improve quality control.

SUMMARY OF THE INVENTION

To achieve these and other objects, there is provided an apparatus for the non-contact measuring of a cylindrical object. The apparatus includes a source of coherent energy and a beam forming means for generating two linearly propagating beams of the coherent energy. A beam guide means causes the two beams to intersect at a predetermined angle. The phenomenon of wave interference occurs in the intersection region, which serves as the measuring volume. A support means positions the beams with respect to a cylindrical object to cause the cylindrical object and the measuring region to intersect one another, with a longitudinal axis of the cylindrical object substantially perpendicular to the beam plane. When present in the measuring volume, the cylindrical object scatters the coherent energy. A signal generating means, including at least first and second coherent energy detectors, generates at least three periodic signals. These include first and second periodic signals generated respectively by the first and second detectors based on respective portions of the coherent scattered energy received by the first and second energy detectors. A phase value generating means, operatively associated with the signal generating means, combines the periodic signals in pairs to generate at least two different phase shift values. Based on the phase shift values, a processing means determines a single transverse dimension of the cylindrical object.

The cylindrical object may be present in the measuring volume continuously as in the case of drawn fiber, or intermittently as in the case of centrifugally generated and blown fibers.

The third periodic signal can be generated by an independent reference source or by a third coherent energy detector.

The phase difference values are used to determine cylinder index of refraction as well as cylinder diameter. Most commonly a change in index of refraction indicates a change in temperature, although a change in material composition also can change the refractive index. Since individual phase shifts are proportional to cylinder diameter, their ratios are independent of the diameter and depend upon the cylinder refraction index only. For small changes in refractive indices, it is also feasible to combine two phase shift measurements linearly to obtain a phase shift value that is independent of cylinder refractive index.

The preferred coherent energy source is a laser diode. Beam collimating optics (which make light rays of the laser beam parallel to each other) and a beam splitting means are advantageously employed to form two parallel collimated laser beams. Wedge prisms or other appropriate deflection means diverting the collimated beams to cause them to intersect. The guide means further can include polarization rotator means for selectively aligning the polarization axes of the beams. A modulation means, such as a Bragg cell, is provided for shifting the frequency of one of the collimated beams by a predetermined frequency.

Preferably, two or three such photodetectors are spaced apart from one another to receive the scattered laser light. The signal processing means, based on inputs from all of the photodetectors, generates outputs based on Doppler frequencies to determine velocities, and outputs based on phase differences to determine cylinder dimensions.

A significant advantage of the apparatus is the rate at which measurements may be taken, i.e. several hundred thousand measurements per second. Given this frequency, at least one measurement can correspond to each millimeter of fiber length even for fiber moving at speeds as high as 100 meters per second. Hence, localized defects may be detected, and overall quality control is significantly improved.

In the preferred embodiment, the frequency of one laser beam is shifted relative to the other, so that moving interference fringes exist in the measurement volume. For an application such as monitoring a fiber diameter during its manufacture, the fiber is located in the measuring volume with its longitudinal axis perpendicular to the beam plane. Light scattered by the fiber (or other cylindrical objects) tends to spread within the plane of the beam and is collected by the photodetectors. The collected signals exhibit sinusoidal oscillations over time. The frequency of oscillations represents the frequency difference between the two laser beams superimposed with Doppler shifts caused by transverse fiber movement. Signals from several different photodetectors have the same frequency. However, these signals exhibit a phase shift that depends upon the cross sectional dimensions of the fiber or other cylinder. In this context, the term "cylinder" refers to any slender elongated object for which an axis (the longitudinal axis) runs lengthwise along the object. The cross section of the cylinder is its sectional view, taken in a plane perpendicular to the longitudinal axis. The cross section may have an arbitrary shape, and cross sectional dimensions may vary gradually along the longitudinal axis.

Transparent cylinders, e.g. optical fibers, scatter light almost solely due to refraction over a wide range of scattering angles, and the resulting phase shift is linearly related to cylinder diameter. Phase sensitivity as high as a 100 degree shift in phase for each micron in diameter may be obtained by employing an appropriate angle between the laser beams and spacing between the detectors. Sensitivity usually increases with increasing beam angle and detector spacing. This high resolution, in combination with the high frequency of measurements discussed above, provides measurement capabilities well beyond those of present fiber sizing systems.

The phase shift between different photodetector signals further can provide information on certain material properties of the cylindrical object. For example, the refractive index of an optical fiber can be determined if two or more phase difference signals are available.

In the case of a refracting object, the phase difference signal depends upon both the particle (or cylinder) diameter and its refractive index. Usually, the refractive index is known and thus the diameter can be determined. However, if both the diameter and the refractive index are unknown, at least two phase different signals (based on at least three detectors) are required for determining the diameter and refractive index.

The present invention is not limited to fiber drawing processes. It may also be used to monitor the drawing of wires, and to examine the size, motion and orientation of fibers carried in a fluid, moving through a weaving machine or the like. Likewise, the invention is not restricted to the use of laser beams to form the measuring volume. Two interfering waves of any form of coherent energy, e.g. ultrasonic or other acoustic energy can interfere with one another to form a measuring volume.

IN THE DRAWINGS

For a further understanding of the above and other features and advantages, reference is made to the detailed description and to the drawings, in which.

Figure 8:
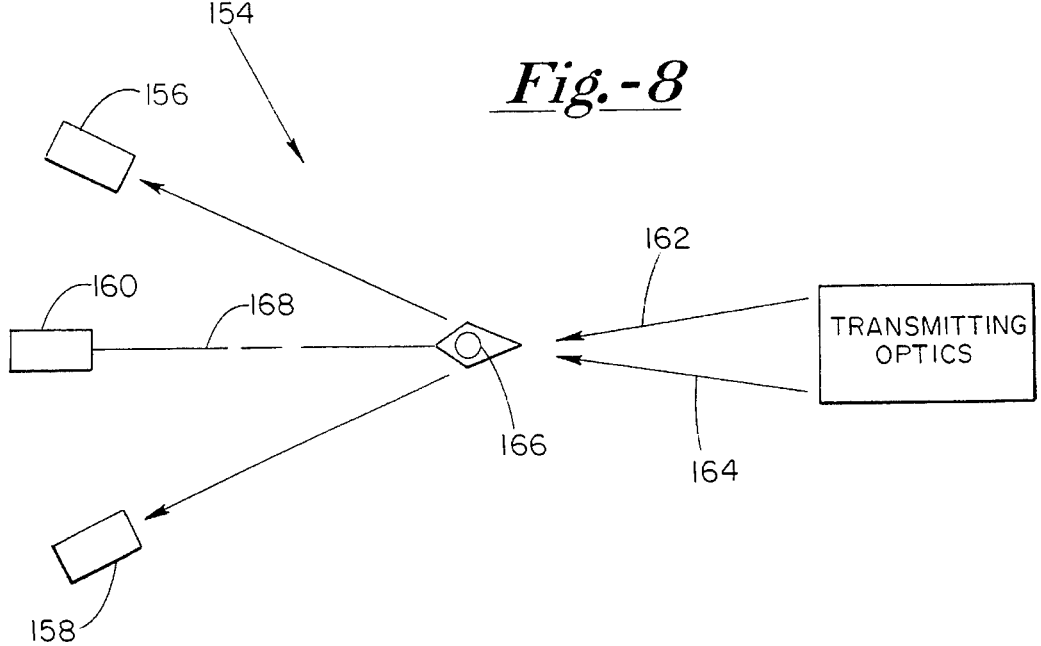
Figure 9:
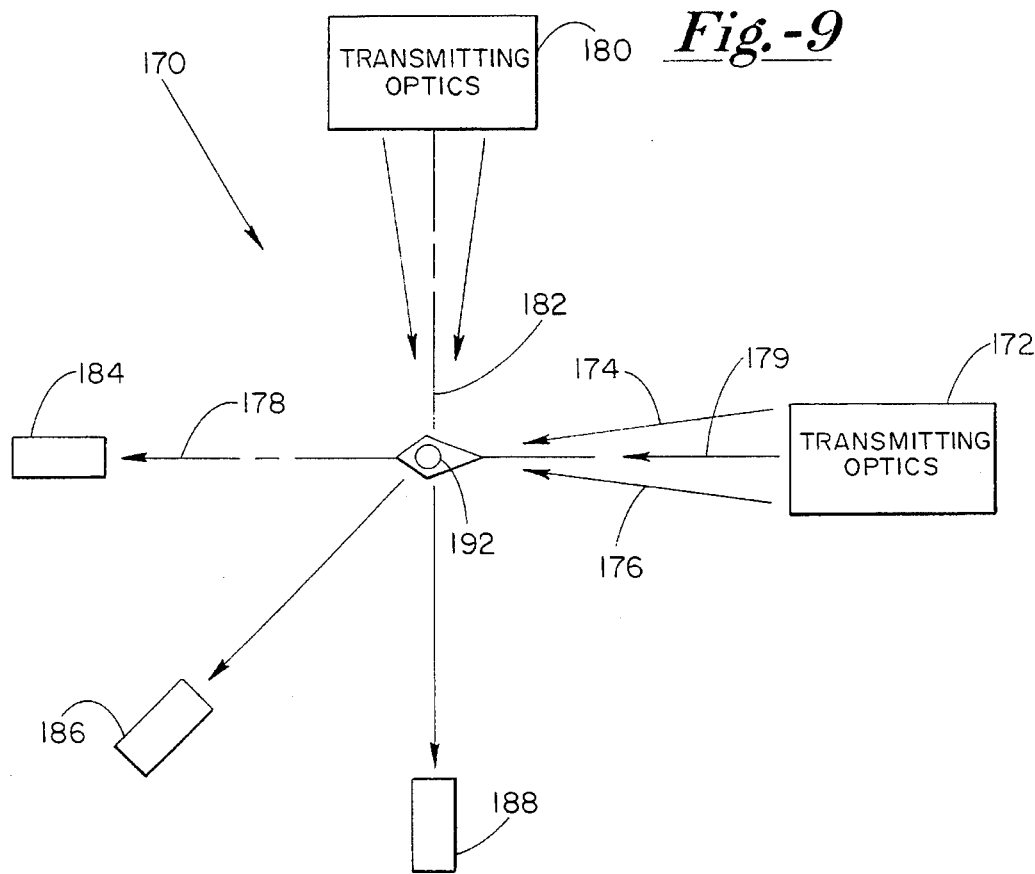
Figure 10:
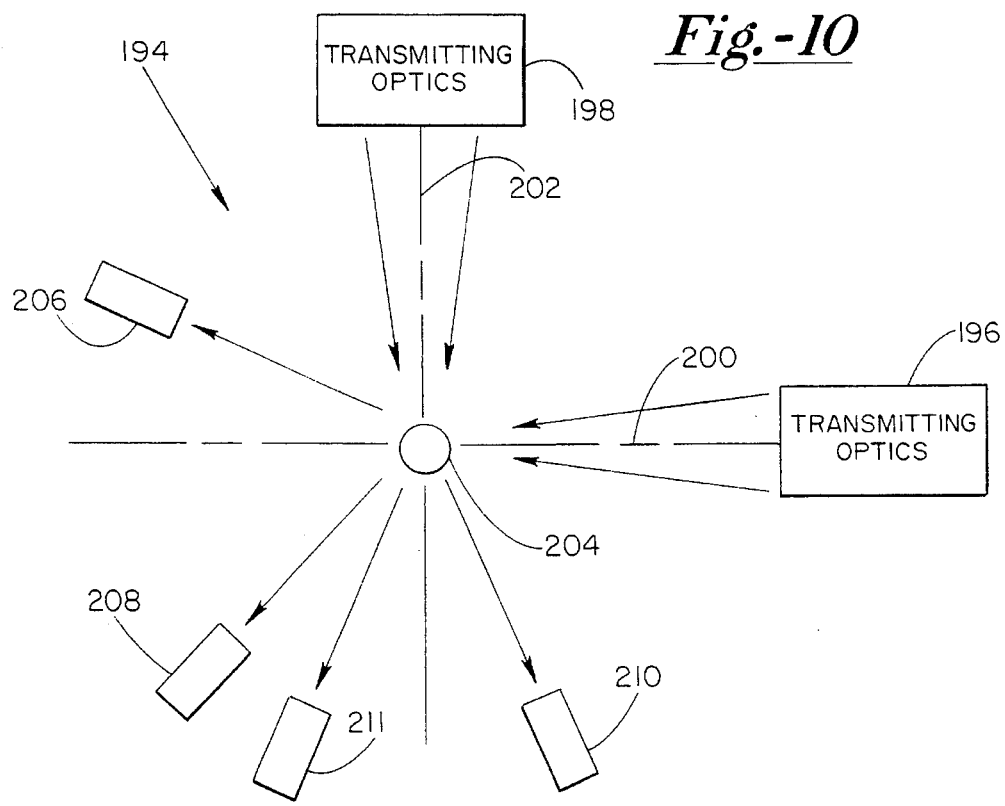
Figure 11:
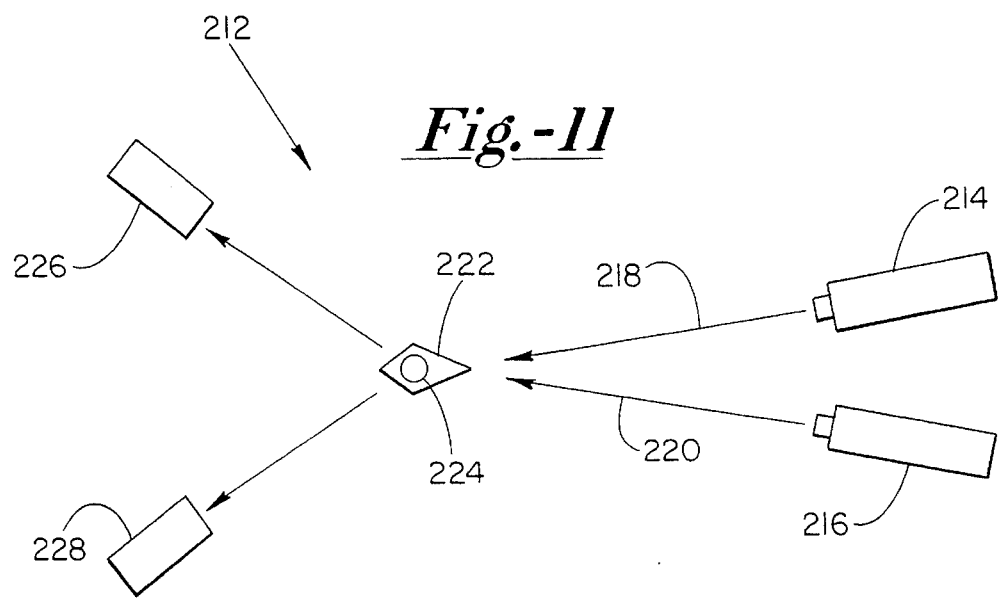
Figure 12:
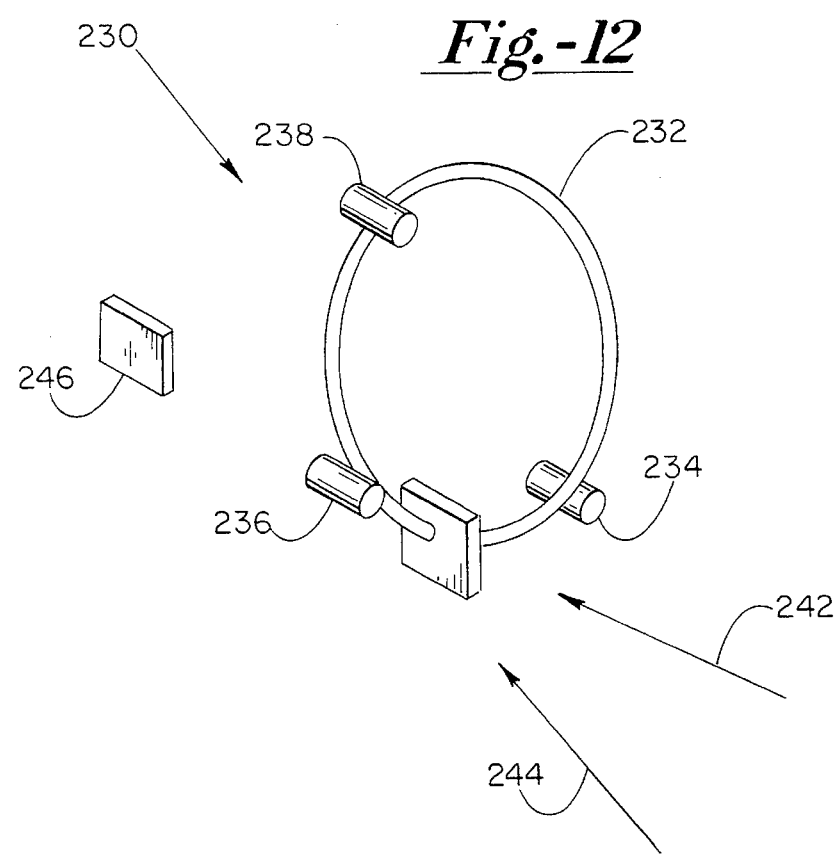
Figure 13:
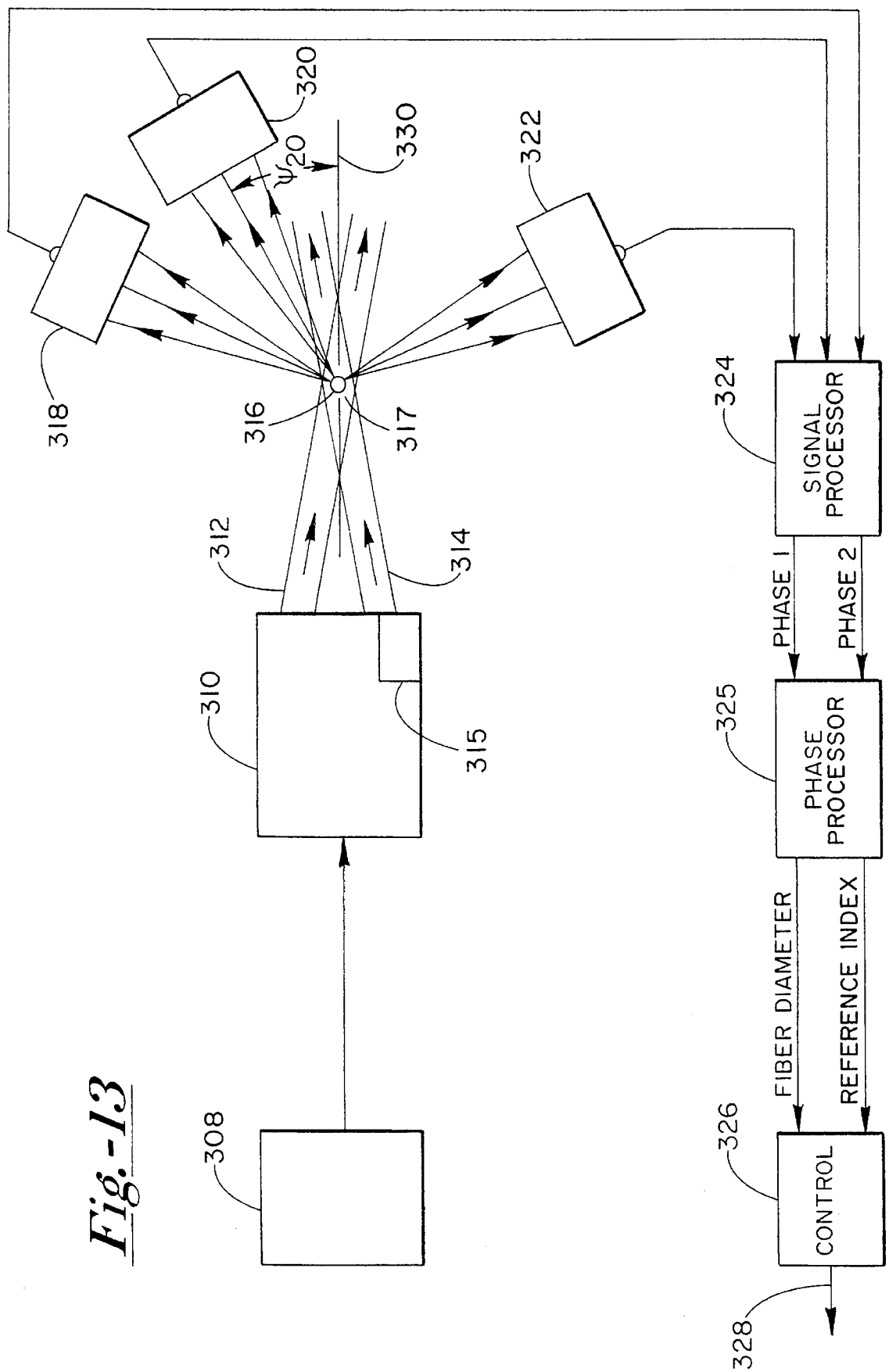
Figure 14:
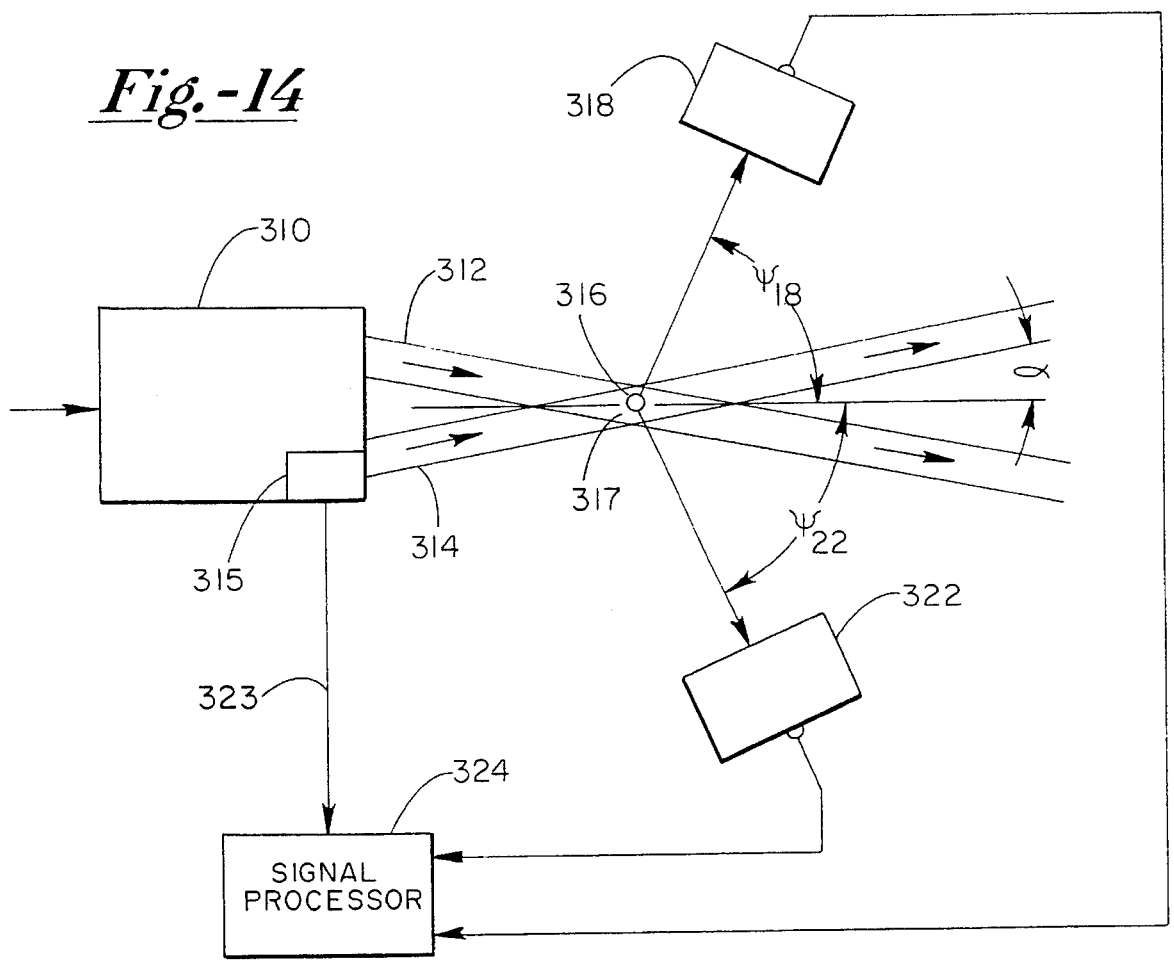
Figure 15:
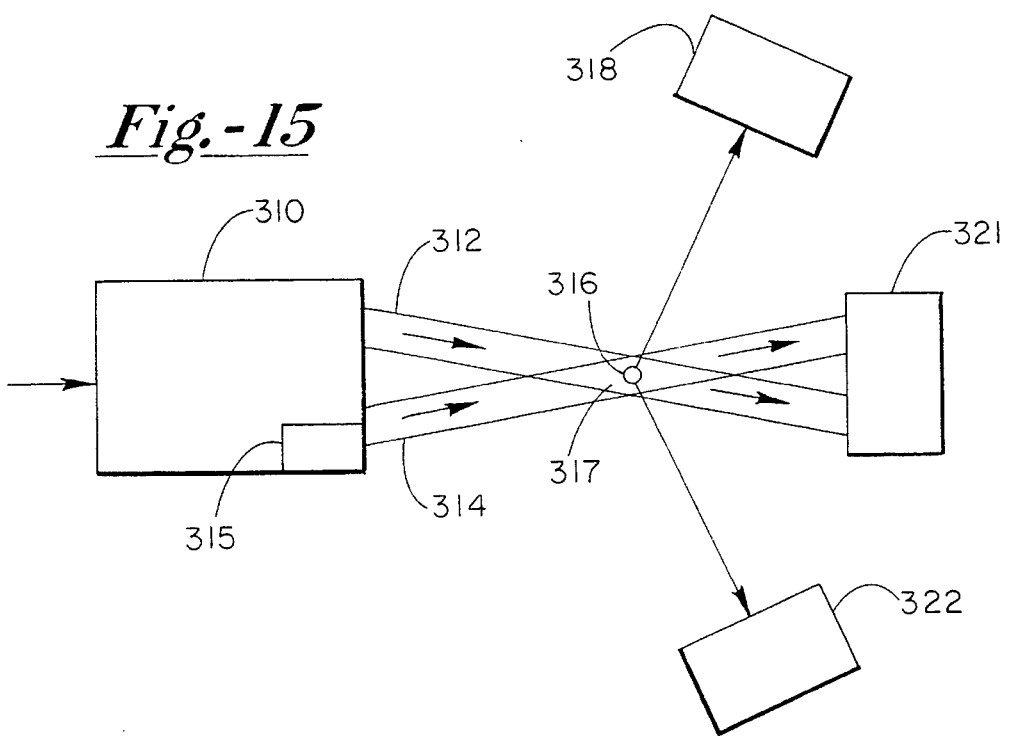

FIG. 8 schematically illustrates another alternative non-contact measurement device employing a third photodetector to resolve ambiguities in phase differences;

FIG. 9 schematically illustrates a further alternative non-contact measurement device employing several pairs of intersecting laser beams aligned along mutually perpendicular axes;

FIG. 10 illustrates yet another alternative non-contact measurement device employing further photodetectors for determining dimensions in two transverse directions;

FIG. 11 schematically illustrates another alternative embodiment non-contact measurement device employing acoustic waves in lieu of laser radiation; and FIG. 12 schematically illustrates a ring inspection process employing non-contact sensing according to the present invention;

FIG. 13 is a schematic view of a further embodiment fiber sizing system, employing three scattered light receiving photodetectors; and FIGS. 14 and 15 are partial schematic views of alternative systems employing, respectively, a reference signal and a photodetector receiving direct laser energy, in lieu of one of the scattered light receiving photodetectors.

DETAILED DESCRIPTION OF THE PREFERRED EMBODIMENTS

Figure 1:
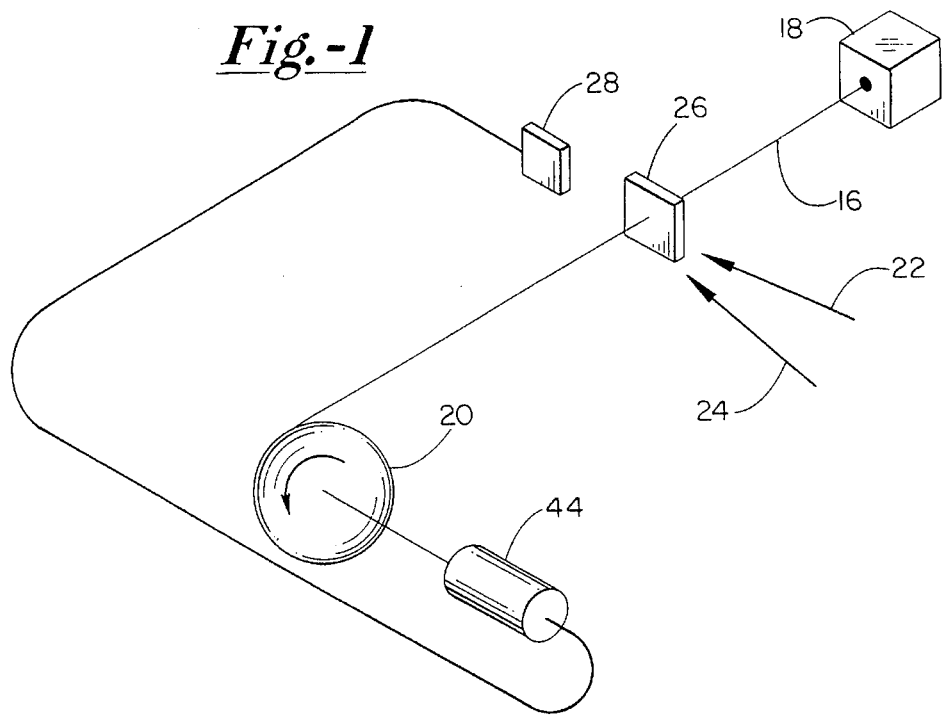
FIG. 1 is a schematic view, in perspective, of an optical fiber drawing process monitored by a non-contact sensing system constructed according to the present invention.

Turning now to the drawings, there is shown in FIG. 1 a system for producing an optical fiber 16. The system includes a material supply 18 containing the material of which optical fiber 16 is constructed. At supply 18, the material is heated or otherwise treated to become formable, whereby it assumes the elongate, circular cylinder shape shown in response to being drawn from supply 18 by a take-up roller 20 or other suitable drawing device. Arrows at 22 and 24 represent two collimated beams of coherent energy, more particularly laser energy. Beams 22 and 24 define a beam plane perpendicular to the longitudinal or lengthwise extension of optical fiber 16. The laser beams intersect one another to form a measurement volume 26. The optical fiber passes through the measurement volume and thus scatters light from beams 22 and 24. Light is scattered due to refraction and reflection, the degree of each depending on the transparency of the optical fiber. A detecting means 28, preferably positioned in the beam plane, receives a portion of the scattered light.

Roller 20 draws optical fiber 16 at a high speed. For example, the linear, longitudinal fiber velocity can be in the range of 10–100 meters per second. It is desired, to the extent possible, to maintain a consistent diameter in optical fiber 16. Of course, it also is advantageous to detect any discontinuities, which may indicate defective material or improper drawing. Given the high speed at which optical fiber 16 is drawn, a high sampling frequency is essential for detecting localized defects, i.e. discontinuities over a longitudinal range of about one millimeter or less. Moreover, a high degree of sensitivity is required for detecting relatively small changes in fiber diameter. To this end, the optical measurement device is capable of taking high resolution measurements within microseconds of one another.

Figure 2:
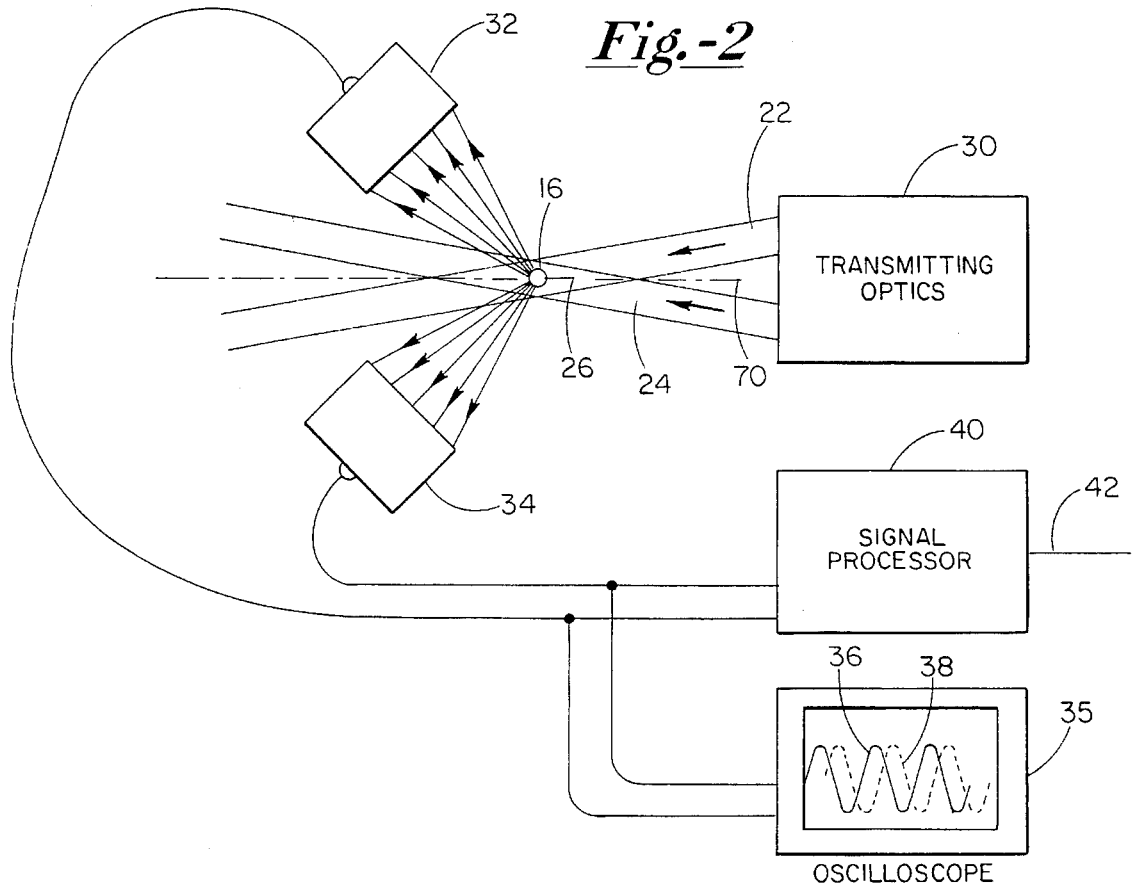
FIG. 2 is a functional block diagram showing optical and electronic subsystems of the sensing system.

In a broad sense, the measurement device utilizes laser energy (or alteratively electromagnetic, acoustic or other types of waves) to implement interferometric principles to measure the size and motion of cylindrical objects. A preferred measurement device is illustrated in FIG. 2. A transmitting optics module 30 generates laser beams 22 and 24, which interfere to produce measurement volume 26. The plane of FIG. 2 is the beam plane and, accordingly, optical fiber 16 appears as a circle in the measurement volume. In the drawing process, optical fiber 16 moves in the longitudinal direction without any substantial lateral displacement, so that it is illuminated continuously by beams 22 and 24.

The optical fiber continuously scatters the laser energy. It tends to scatter the radiation over a restricted region in and near the beam plane, with the highest intensity being within the plane. The detecting means includes two optical receivers 32 and 34, spaced apart from one another and located within the beam plane. Each of the optical receivers collects the scattered light and generates an analogue electrical signal as its output, based on the received light.

Locating the optical receivers within the beam plane affords a substantial advantage as compared to conventional phase Doppler arrangements which position the receivers in scattering planes perpendicular to the beam plane. It has been found that when the optical receivers are positioned in the beam plane, the system exhibits a substantially higher sensitivity in measuring diameters based on phase shift. More particularly, it has been found that a planar system can employ a beam angle alpha about ⅕ the beam angle of an equivalent conventional system, yet achieve the same degree of accuracy in measuring diameters.

The respective outputs may be provided to an oscilloscope for visual inspection, and are represented at 36 and 38, respectively. The horizontal axis of the oscilloscope represents time and the vertical axis represents voltage. Signals 36 and 38 represent temporal oscillations of voltage. The phase shift between the two signals is dependent on the diameter of optical fiber 16. Under certain conditions, the phase shift is proportional to the fiber diameter.

The optical receiver outputs are provided to a signal processor 40, which generates an analogue electrical output at 42, proportional to the phase shift between the two signals. The output 42 is provided as a feedback to a controller 44 (FIG. 1). The controller effects an adjustment in response to a sensed deviation from a preferred diameter, e.g. by changing the rotational velocity of roller 20 or by temporarily terminating the process. If desired, controller 44 also can respond to transverse movement of optical fiber 16, above an acceptable minimum. Thus, signal processor 40 generates feedback in response to a sensed disturbance or deviation, thereby insuring production of a more uniform optical fiber.

Figure 3:
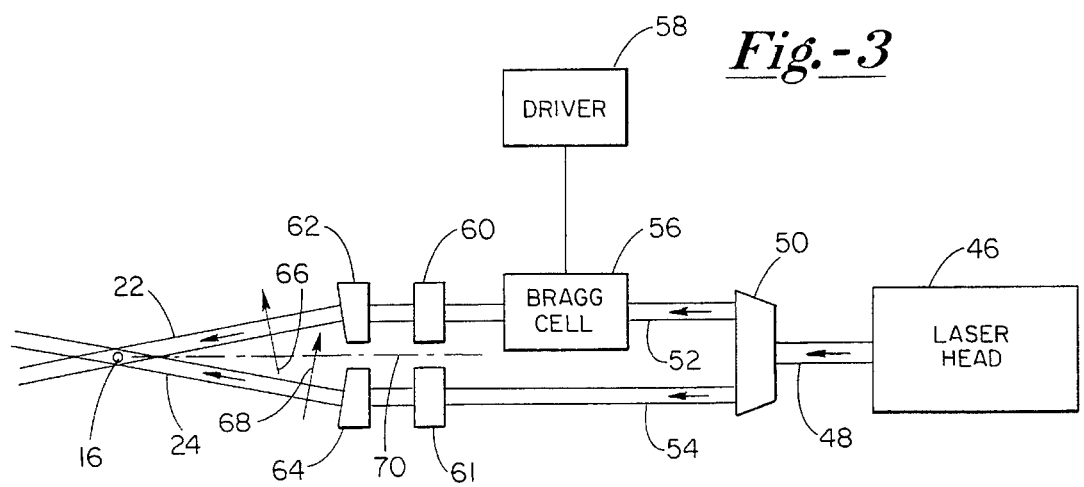
FIG. 3 is a more detailed schematic view of part of the optical subsystem illustrating transmitting optics.

As shown in FIG. 3, transmitting optics module 30 includes a laser head 46, including a diode laser and collimating optics for generating a collimated laser beam 48. Downstream of the laser head, a beam splitter 50 receives the collimated beam and generates a pair of collimated laser beams 52 and 54. Collimated beam 52 is directed to an acousto-optic modulator or Bragg cell 56. The Bragg cell is driven by a power supply 58 to selectively shift the frequency of laser beam 52 by a predetermined amount, typically 40 MHz relative to laser beam 54.

Downstream of the Bragg cell, parallel laser beams 52 and 54 are passed through respective polarization rotators 60 and 61. Each polarization rotator selectively orients the polarization axis of its associated laser beam, such that both polarization axes lie within the beam plane, i.e. the plane of FIG. 3. Next, the laser beams are passed through respective wedge prisms at 62 and 64. Each wedge prism alters the direction of propagation of its associated laser beam, thereby providing laser beams 22 and 24 which intersect one another at measurement region 26. The beams remain collimated and are not focused. The arrows at 66 and 68 show the orientation of the respective electric polarization axes, i.e. within the beam plane and perpendicular to the direction of propagation. This orientation is needed in connection with optical fibers or other substantially transparent cylinders.

A beam axis 70 bisects the angle between beams 22 and 24. Each of the beams is separated from the beam axis by an angle alpha. Optical receivers 32 and 34 are in the beam plane, and separated from the beam axis by respective elevation angles $psi_1$ and $psi_2$. Optical receiver 32 includes a positive (convex) lens 72 for collecting and collimating scattered light, a photodetector 74, and a positive lens 76 for focusing the collected light onto photodetector 74. The photodetector preferably is an avalanche photo diode. Optical receiver 34 is similar, including lenses 78 and 80 and a photodetector 82.

Figure 4:
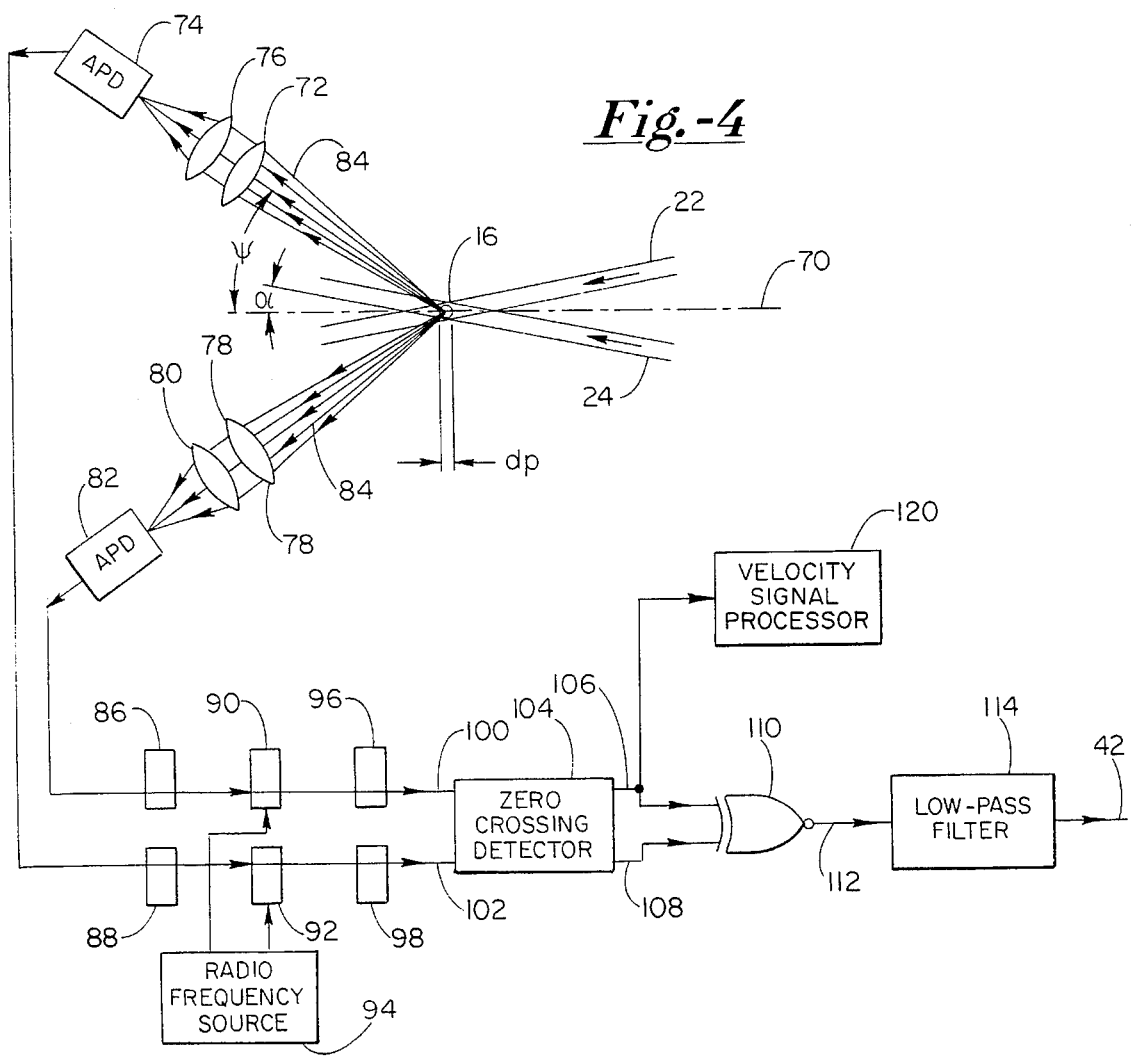
FIG. 4 is a more detailed schematic view showing parts of the optical and electronic subsystems, illustrating receiving optics and electronic components.

As seen in FIG. 4, laser beams 22 and 24 illuminate optical fiber 16 and are scattered, as indicated at 84. Scattered light 84 diverges in the direction away from optical fiber 16, yet remains confined closely to the beam plane. This is due to the two-dimensional nature of the optical fiber and its alignment perpendicular to the beam plane. The limited scattering is in contrast to scattering by three-dimensional objects such as spherical particles which scatter light in all directions away from the particle.

Photodetectors 74 and 82 generate respective analogue electrical output signals, each signal based on the received light. Each of the photodetector output signals has a frequency of about 40 MHz, i.e. substantially equal to the frequency shift of laser beam 52 relative to laser beam 54. The photodetector output signals are provided to respective high pass filters 86 and 88 to remove the signal pedestals. Then, the signals are provided to respective mixers 90 and 92. A reference signal from a radio frequency source 94 is provided to the mixers and mixed with the output signals to reduce their frequencies to about 1 MHz. The reduced-frequency output of each mixer is provided to an associated low pass filter, as indicated at 96 and 98, respectively. The output of each low pass filter is a sinusoidal electrical analogue signal. The output of low pass filter 96 is indicated in a solid line at 100 (FIG. 5), while a broken line 102 indicates the output of low pass filter 98. Signals 100 and 102 exhibit only the difference between the original frequencies (respective photodetector outputs) and the reference frequency. However, the phase shift between the signals remains unchanged. The down-mixed signal outputs of the low pass filters have frequencies of about 1 MHz. In FIGS. 5A–D, the horizontal axes represent time and the vertical axes represent voltage. Thus the phase shift between signals 100 and 102 is indicated by their horizontal displacement. Signals from the low pass filters are provided to a zero crossing detector 104, which converts the sinusoidal signals to square waves, i.e. digital signals 106 and 108.

The digital signals are then provided to an exclusive OR logic gate 110. Whenever digital signals 106 and 108 are both high, and whenever these signals are both low, the output of OR gate 110 is the low voltage. The OR gate output goes high whenever one of the digital signals is high while the other is low. The OR gate output is indicated at 112 in FIG. 5. The low output voltage of OR gate 110 corresponds to signals 100 and 102 being in phase. Out-of-phase signals result in the high level voltage as the OR gate output. The duration for which the OR gate output is high increases linearly with an increasing phase shift until the phase shift reaches 180°. The phase indication remains unambiguous, so long as the phase shifts are less than 180°.

Figure 5:
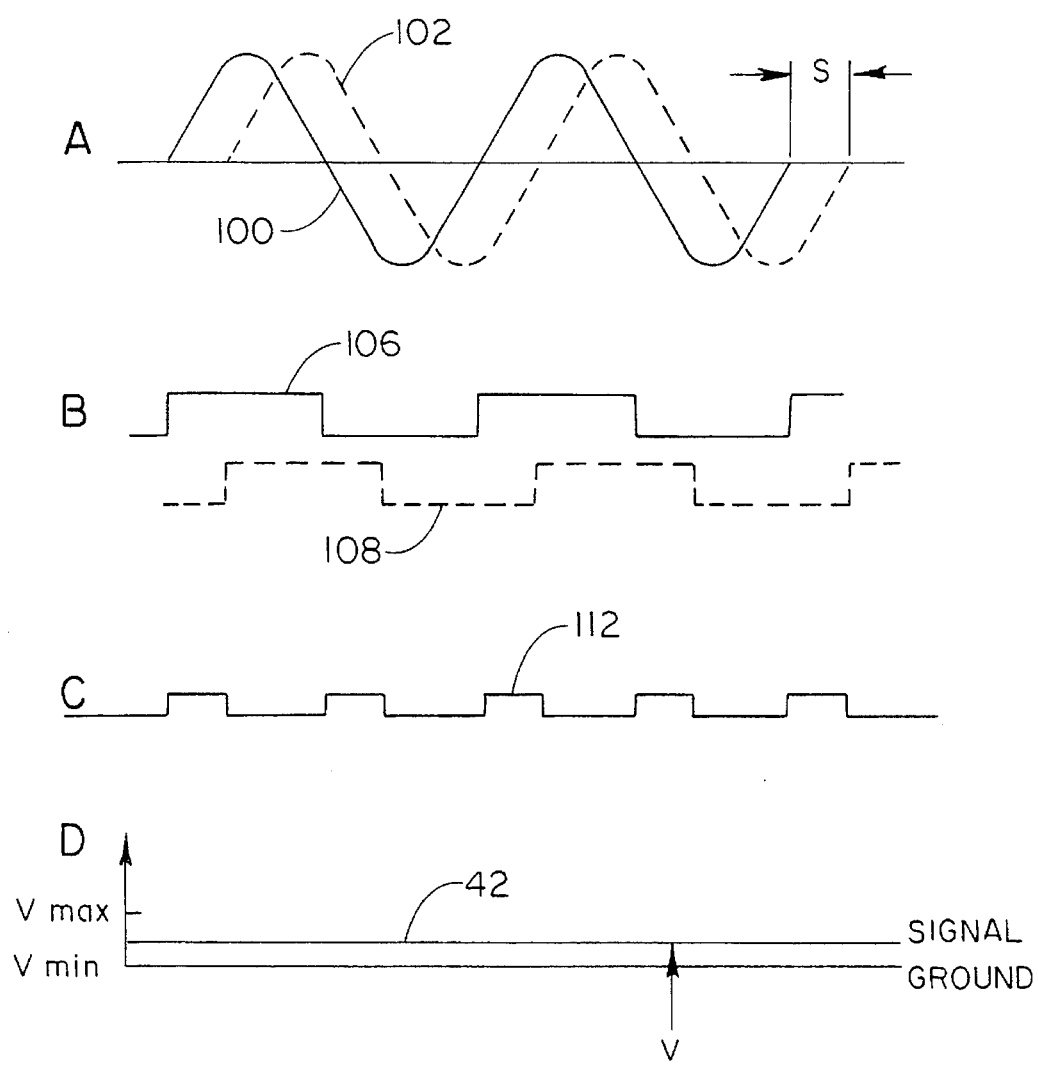
FIG. 5 is a graphical representation of electrical signals based on phase differences and frequencies in scattered radiation received by the detecting optics.

The digital output of exclusive OR gate 110 is provided to a low pass filter 114, which generates output 42 as an analogue signal. As best seen in FIG. 5, signal 42 is an analogue signal having a voltage V between the low and high voltage levels of OR gate output 112. The amplitude of signal 42 is proportional to the phase shift. Accordingly, signal 42 measures the deviation from a reference value corresponding to a preferred or designated diameter for optical fiber 16. The deviation is used as feedback to controller 44 to trigger an adjustment in fiber drawing speed, a warning signal, a temporary shutdown of the process, or other appropriate response.

Given the 1 MHz frequency of signals 100 and 102, deviations in the optical fiber diameter are detected (by signal 42) with a delay not exceeding ten microseconds. As a result, even if optical fiber 16 is drawn at an excessively high speed, e.g. 100 meters per second, any unacceptable deviation in fiber diameter from the reference value is detected and provided to controller 44, before the optical fiber has travelled 1 millimeter through the measuring volume. As a result, highly localized defects are subject to detection. A correction and/or warning occurs virtually instantaneously.

The device further affords high resolution in determining phase shift. Based on preliminary estimates, the amplitude (i.e. voltage) of signal 42 can be detected with a resolution of about 5% of the range of 180 degrees. Accordingly, phase shifts can be measured with a resolution of about 9 degrees.

The theory of phase shift between a pair of signals generated by cylindrical objects is similar to that of phase shift associated with spherical particles. The theory relating to spherical particles was first reported in 1975 in a paper entitled *Laser Doppler Measurements in Two-Phase Flows*, by Durst and Zaré (1975). Based on geometrical scattering from transparent cylindrical objects, where the principle scattered light is refracted through the object, phase shift between a detector at an elevation angle psi and a reference detector along the beam axis, is given by the equation:

$$\phi = \frac{360° \, d}{\lambda} \left[ \sqrt{n^2 = 1 - n \sqrt{2(1 - \sin\alpha\sin\psi + \cos\alpha\cos\psi)}} - \sqrt{n^2 + 1 - n \sqrt{2(1 + \sin\alpha\sin\psi + \cos\alpha\cos\psi)}} \right]$$

where d is the fiber diameter, lambda ($\lambda$) is the wave length of the laser beam, n is the refracted index of the fiber relative to the surroundings, and alpha $\alpha$ is the angle between each laser beam and the beam axis, psi ($\Psi$) is the elevation angle, and theta $\Phi$ is the phase shift.

Figure 6:
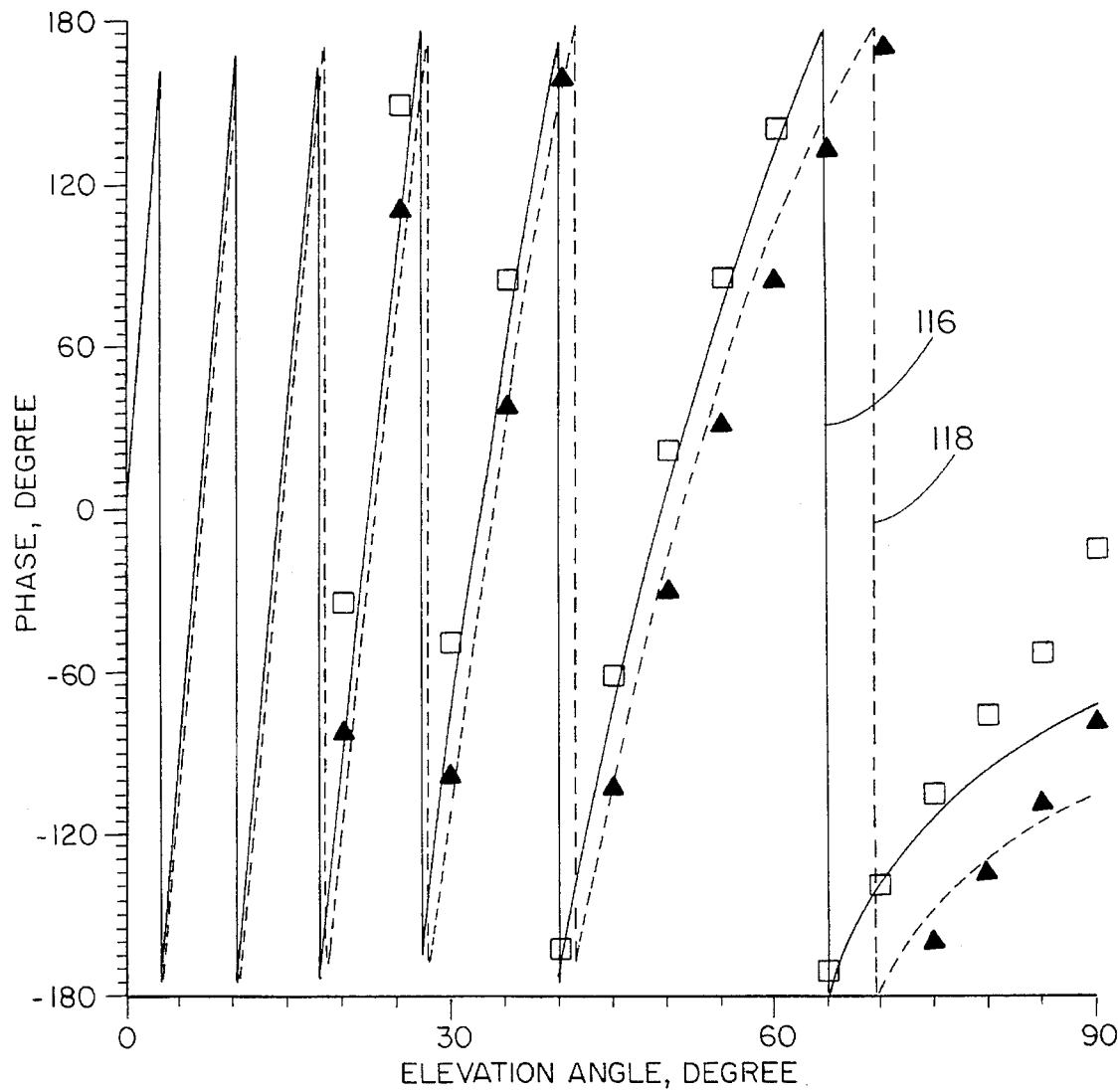
FIG. 6 is a graphical representation of experimental data showing phase shift information for fibers of two different diameters.

This equation is represented graphically in FIG. 6 for a refractive index of 1.51, a wave length of 632.8 nannometers, and a beam angle alpha of 1.685 degrees. Phase response, as a function of elevation angle psi, is shown for two different fiber diameters, i.e. a diameter of 125 microns at 116, and 123 microns at 118 broken line. Symbols in FIG. 6 show measured data based on two sample optical fibers having the respective diameters The squares represent the 125 micron diameter, and the triangles represent the 123 micron diameter. They and verify the validity of the above equation for elevation angles ranging from about 20 degrees to about 75 degrees. Accordingly, there is a wide range of possible angular positions for optical receivers.

In view of the above equation and the data represented in FIG. 6, an optical system can be configured so that the aforementioned phase shift of 9 degrees corresponds to a 0.1 micron variation in fiber diameter. This represents improvement by an order of magnitude in sensitivity as compared to conventional measurement approaches.

In an ideal manufacturing process there should be no lateral movement of optical fiber 16 as it is drawn in the longitudinal direction. As a practical matter, however, the optical fiber moves laterally (i.e. transversely) as well as longitudinally. The present sensing device can be employed to detect such lateral movement as well, in order to facilitate a warning or adjustment if such movement exceeds a predetermined acceptable level.

To sense lateral velocity, the photodetector outputs are provided to a velocity signal processor 120. Lateral movement of fiber 16, particularly in the vertical direction as viewed in FIG. 4, gives rise to a difference in Doppler frequencies of photodetectors 74 and 82. The lateral velocity is determined based upon the difference in frequencies.

It has been found that in a measurement system for characterizing cylinders, it is advantageous to illuminate the cylinder with interfering beam pairs that are collimated rather than focused. The scattering phenomenon is two-dimensional if the detectors lie within the near-field of the collimated beams as they exist in the measurement volume. This condition may be expressed as the equation:

$$L \ll \frac{D^2}{\lambda}$$

where D is the collimated laser beam diameter and L is the detector stand-off, i.e. the linear distance from the fiber to the detector. Given a beam diameter D on the order of about one millimeter and a diode laser wavelength lambda equal to 0.83 microns, the quantity $D^2$/lambda is larger than 1 meter. Thus, the near-field condition is readily satisfied by locating detectors at a distance of a few hundred millimeters from the optical fiber. This ensures that the scattering phenomenon is two-dimensional and the measured signal is unaffected by the positioning of the detector along the fiber length.

It also is desirable that the detectors lie in the far-field of the scattering object, i.e. the fiber. This condition may be expressed by the equation:

$$L \gg \frac{d^2}{\lambda}$$

Where d again is the fiber diameter. This condition ensures that the phase differences between the signals are caused solely by the path length differences encountered during propagation of the light through the fiber, and not by the path length differences experienced by light rays during propagation through the free space between the fiber and the detector.

The above equations can be combined into a single correlation that defines the upper and lower limits on the detector standoff for given values of wavelength, beam diameter and fiber diameter as follows:

$$\frac{D^2}{\lambda} \gg L \gg \frac{d^2}{\lambda}$$

Accordingly, it is desirable that the collimated laser beam diameter be substantially larger than the cylinder diameter, e.g. about 1 mm as compared to a fiber diameter on the order of 100 microns.

Figure 7:
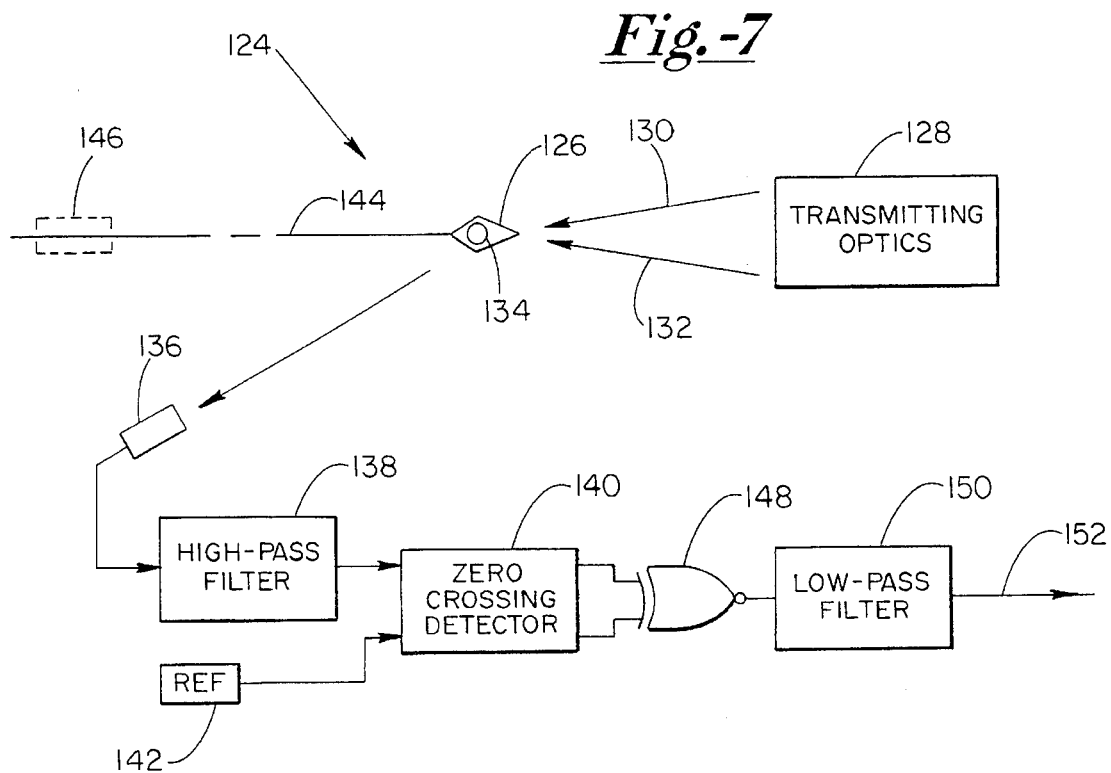
FIG. 7 illustrates an alternative non-contact measuring device employing a single photodetector.

FIG. 7 illustrates a simplified alternative measurement system 124 for characterizing a cylindrical object 126. The cylindrical object is preferably stationary or capable of being moved longitudinally without any lateral movement. System 124 includes a transmitting optics module 128 which generates collimated laser beams 130 and 132 that intersect to form a measurement volume 134. Light scattered by object 126 enters an optical receiver 136.

The optical receiver output is provided to a high-pass filter 138. The high-pass filter 138 provides its output to a zero crossing detector 140. A reference signal from a radio frequency source 142 also is supplied to the zero crossing detector. The reference signal is equivalent to the input from an optical receiver positioned along beam axis 144, e.g. where indicated in broken lines at 146. Further, this "phantom" optical receiver is assumed to receive scattered light based on a predetermined diameter or acceptable diameter range for object 126.

Based on its inputs, zero crossing detector 140 generates one digital output corresponding to the reference signal, and another digital output corresponding to optical receiver 136. The digital outputs are provided to an exclusive OR gate 148, which generates its output to a low pass filter 150, resulting in a voltage signal at 152 representing a "phase difference" between optical receiver 136 and the signal representing the "phantom" optical receiver 146.

System 124 is capable of determining the diameter of cylindrical object 126 and thus is capable of triggering a desired response, such as a warning signal, if the object's diameter deviates from the expected norm. However, this system lacks the capability for measuring transverse velocity components and thus should be restricted to measurements of stationary objects or objects confined to controlled longitudinal movement.

FIG. 8 illustrates an alternative system 154 similar to the measurement system in FIG. 2, except that three optical receivers 156, 158 and 160 are provided in the beam plane defined by laser beams 162 and 164. A cylinder 166 is oriented with its longitudinal axis perpendicular to the beam plane. A beam axis 168 bisects the angle between the laser beams.

Optical receiver 160 is disposed along beam axis 168. Such positioning is not necessary but is useful in that it facilitates using optical receiver 160 to generate a reference signal. Regardless of whether it lies along the beam axis, optical receiver 160 has further utility in resolving the "$2\pi$" ambiguity when phase differences between receivers exceed 360°. The three-receiver arrangement can resolve ambiguities of other non-monotonic responses as well. In particular, two different pairs of optical receivers 156, 158 and 160 can be selected to provide two different values of elevation angle psi. A probability density function is generated for each value of psi, based on the above equation relating phase difference to diameter. Typically, each of these probability density functions includes several peaks. Therefore, each probability density function, taken alone, creates some ambiguity as to the correct diameter.

The probability functions can be combined (i.e. multiplied) to eliminate the ambiguity. Each of the probability functions has a peak corresponding to the actual diameter, and these two peaks coincide. The remaining peaks of the probability functions are unlikely to coincide. As a result, multiplication tends to emphasize the peak in each function corresponding to the actual diameter, and tends to suppress the remaining peaks. The determination of diameter by joint probability density functions, based on several pairs of optical receivers, is particularly useful in measuring less transparent or opaque objects where the phase/diameter relationship is non-linear. It is also useful for measuring very small cylinder diameters, for which the phase diameter relationship is usually not linear.

FIG. 9 illustrates a measurement system 170 for sensing velocity and displacement in the axial or longitudinal direction, and in two perpendicular transverse directions. The system includes two transmitting optics modules including a module 172 positioned as previously discussed to generate interfering laser beams 174 and 176 bisected by a beam axis 178. The module 172 also generates a pair of laser beams, indicated at 179, lying in a plane perpendicular to the plane of beams 174 and 176 and intersecting that plane along beam axis 178. Beam pair 179 is used to measure the axial component of fiber velocity. A module 180 generates an interfering pair of laser beams bisected by a beam axis 182, which is perpendicular to beam axis 178. It is preferred, although not essential, to position beam axes 178 and 182 in the same plane. Optical receivers 184, 186 and 188 are positioned in the plane of beam axes 178 and 182, to receive scattered light from all pairs of laser beams. Alternatively, each of the optical receivers can be dedicated to receive scattered light only from one of the laser beam pairs.

The signals generated by the individual beam pairs may be separated by electronic or optical filtering. Optical filtering is effective when different colors of light are employed in different beam pairs. On the other hand, electronic filtering is suitable if different shift frequencies are employed in different beam pairs in order to distinguish them from one another. For example, beam 174 can be shifted relative to beam 176 by 40 MHz, while one of the beams in beam pair 179 is shifted by 80 MHz.

The outputs of three optical receiver pairs, each corresponding to one of the laser beam pairs, are provided to respective velocity signal processors, in each case to determine velocity based on differences in Doppler frequencies.

FIG. 10 shows a measurement system 194 in which two transmitting optics modules 196 and 198 generate respective pairs of interfering laser beams bisected by respective and coplanar beam axes 200 and 202. A cylindrical object 204 with an ellipsoid cross section is oriented with its longitudinal axis perpendicular to the beam plane. Optical receivers 206, 208, 210 and 211 receive the scattered light, and provide their outputs to signal processors for determining phase differences corresponding to two diameters of object 204 taken in two perpendicular transverse directions. Optical or electronic filters are employed in order to ensure that detectors 206 and 208 deliver only signals generated by the transmitting module 196, while detectors 210 and 211 deliver signals only in response to module 198. Under special conditions, the functions of detectors 208 and 211 may be performed by a single detector.

System 194 is particularly useful in drawing processes where the cross section of cylindrical object 204 is elliptical rather than circular. More particularly, in a system that measures diameter in only one transverse direction, a twisting or other rotation of object 204 could lead to a false indication of an increase or decrease in average diameter. By measuring diameters in two perpendicular transverse directions such false reading is avoided, as a perceived increase of diameter in one direction would be matched by a perceived decrease in diameter in the other direction. System 194 also is useful for the more general purpose of characterizing cylinders with irregular cross sections.

FIG. 11 illustrates a measurement system 212 based on acoustical energy. More particularly, first and second ultrasonic transducers 214 and 216 generate ultrasonic waves 218 and 220 respectively. The ultrasonic waves interfere with one another over a measurement volume 222. A cylindrical object, e.g. a drawn wire 224, is positioned with its longitudinal axis perpendicular to the plane defined by ultrasonic waves 218 and 220.

Ultrasonic transducers 226 and 228 in the plane of waves 218 and 220 receive portions of the ultrasonic waves reflected by wire 224. The outputs of ultrasonic transducers 226 and 228 are electric analogue frequency signals and can be processed much in the same manner as discussed in connection with FIG. 4.

FIG. 12 illustrates a measurement system 230 in which a hoop or ring 232 is rotated in a controlled manner utilizing a drive roller 234 and two idler 236 and 238. A lower region of ring 232 is positioned in a measurement region 240 formed by two interfering laser beams 242 and 244. Ring 232 is perpendicular to a beam plane defined by laser beams 242 and 244 in the sense that the axis of the ring, considered along the portion of the ring within the measuring region, is perpendicular to the beam plane. A photodetector 246 receives light scattered by ring 232 and generates an electric analogue output used to measure the thickness of ring 232 along its circumference, based on readings of phase difference.

FIG. 13 shows a further alternative interferometric cylinder sizing system. A laser beam from a laser source 308 is passed through beam conditioning optics 310, where the laser beam is split into two beams 312 and 314. Beam 314 is directed through a Bragg cell 315 to modulate its frequency, so that the beam frequencies are shifted relative to one another. The laser beams 312 and 314 are guided to intersect each other, where they interfere with one another and form a measuring volume 317. A cylindrical object 316 under investigation is located in the interference region of the two laser beams. In this case the cylindrical object is an optical fiber being manufactured by a drawing process. Accordingly, optical fiber 316 is continually present within the measuring volume. In alternative processes employing the same cylinder sizing system, the cylindrical object can be one of numerous centrifugally formed and blown glass fibers. In either event, the light scattered by cylindrical object 316 is collected by the photodetectors 318, 320 and 322, with each photodetector collecting a different portion of the scattered energy. These detectors translate the optical signals into analog electrical signals, which are provided to a signal processor 324. The signal processor selectively combines the periodic signals from the detectors into two pairs of signals, and determines a phase shift or phase difference corresponding to each selected signal/detector pair. The signal processor output, i.e. two phase shift values, is further processed by a phase processor 325. Processor 325, based on the phase shifts, determines fiber diameter and refractive index.

The phase processor provides this information to a process controller 326. Controller 326 governs the manufacturing process and can provide a variety of control signals via a path indicated at 328, e.g. to adjust the speed at which optical fiber 316 is drawn, to provide a warning or alarm, or to shut down the process, all in response to the input from phase processor 325.

Beams 312 and 314 are angularly spaced from one another by an angle $2\alpha$, to define a beam plane which, in FIG. 13, is the plane of the drawing. A beam axis 330, in the beam plane, bisects the beam angle. Accordingly, each of the beams is angularly separated from the beam axis by an angle $\alpha$. Each of photodetectors 318, 320 and 322 intersects the beam plane and is at least approximately centered with respect to the beam plane. Scattered light from fiber 316 travels to each detector at an elevation angle $\psi$, taken with reference to the fiber and with respect to beam axis 330. More particularly, detectors 318, 320 and 322 have elevation angles $\psi_{18}$ of plus 45°, $\psi_{20}$ of plus 25° and $\psi_{22}$ of minus 45°. Each of photodetectors 318, 320 and 322 generates a periodic (more particularly sinusoidal) analog electrical signal in response to received scattered energy.

To conveniently designate directions, the system in FIG. 13 can be considered in terms of an xyz coordinate system in which the x direction is vertical as viewed in the figure, and the y direction is perpendicular to the plane of the figure, and the z direction is horizontal, i.e. the direction of beam axis 330. The three sinusoidal signals are processed to measure size and refractive index of cylindrical object 316. For this purpose, phase differences $\Phi_1$ and $\Phi_2$ are measured between two pairs of the three signals, e.g. from detectors 318 and 322 and from detectors 320 and 322. Both of these phase difference or phase shift values are proportional to the diameter of cylindrical object 316 denoted by d, according to the equations:

$$\Phi_1 = S_1 d \quad (1)$$

and $$\Phi_2 = S_2 d \quad (2)$$

where sensitivity factors $S_1$ and $S_2$ are given by $$S_1 = \frac{360°}{\lambda} [F_{18} - F_{22}] \quad (3)$$

and $$S_2 = \frac{360°}{\lambda} [F_{20} - F_{22}] \quad (4)$$

Optical parameters in equations (3) and (4) are defined as below:

$$F_{18} = \sqrt{n^2 + 1 - n \sqrt{2(1 - \sin\alpha\sin\psi_{18} + \cos\alpha\cos\psi_{18})}} \\ - \sqrt{n^2 + 1 - n \sqrt{2(1 + \sin\alpha\sin\psi_{18} + \cos\alpha\cos\psi_{18})}} \quad (5)$$

$$F_{20} = \sqrt{n^2 + 1 - n \sqrt{2(1 - \sin\alpha\sin\psi_{20} + \cos\alpha\cos\psi_{20})}} \\ - \sqrt{n^2 + 1 - n \sqrt{2(1 + \sin\alpha\sin\psi_{20} + \cos\alpha\cos\psi_{20})}} \quad (6)$$

and $$= \sqrt{n_2 + 1 - n \sqrt{2(1 - \sin\alpha\sin\psi_{22} + \cos\alpha\cos\psi_{22})}} \\ - \sqrt{n^2 + 1 - n \sqrt{2(1 + \sin\alpha\sin\psi_{22} + \cos\alpha\cos\psi_{22})}} \quad (7)$$

where $\lambda$ is the wavelength of the laser energy, n is the refractive index of fiber 316, and $\alpha$ is the angle between each laser beam and beam axis 330.

It is clear from equations (1)–(7) that the ratio between $\Phi_1$ and $\Phi_2$ is independent of the cylinder size, and is a function only of the refractive index n of the cylinder, since $\lambda$ and $\alpha$ remain constant. Once the refractive index has been determined, it is used to provide conversion factors for generating cylinder diameter readings based on phase differences.

In certain applications, the refractive index of the cylinder is a function of the cylinder temperature. In this event, the present system can be used to determine the temperature of optical fiber 316, as well as its diameter. Determination of size and temperature (i.e. size and refractive index) is enabled by the three photodetectors, selected in pairs to provide two phase shift values for solving for two variables (d and n) in equations (1) and (2). This avoids a problem inherent in sizing systems that employ two photodetectors to generate a single phase shift value. In particular, there is a risk in such systems that a change in the refractive index is misread as a change in fiber diameter, when it occurs due to a change in temperature, material composition or any other factor that influences refractive index rather than diameter.

In other applications, it may be desirable only to correct for the errors caused by refractive index variations. In such cases it is not necessary to consider a ratio of two phase differences. Instead, a linear combination of measured diameters $d_1$ and $d_2$, based on the two phase difference measurements and a nominal refractive index value, are employed to determine fiber diameter.

Considering only the first-order effects, the correct diameter is given as $$d = d_1 + p\Delta d, \quad (8)$$

where $$\Delta d = d_1 - d_2 \quad (9)$$

and parameter p is related to the sensitivity factors as follows:

$$p = \frac{1}{\frac{S_2 \Delta S_1}{S_1 \Delta S_2} - 1}, \quad (10)$$

where $\Delta S_1$ and $\Delta S_2$ represent changes in the corresponding sensitivity factors for a small change in the refractive index. Parameter p can be calculated using equations (3)–(7) or it can be determined experimentally using a first pair of fibers with a certain refractive index n and a second pair with a different refractive index $n+\Delta n$, the two fibers in each pair having known but different diameters.

In a particular realization, involving a laser wavelength $\lambda$ of 0.78 μm and beam angle $2\alpha$ of 4°, the optimal diameter is given by $$d = d_1 + 2.8\Delta d, \quad (11)$$

where $d_1$ is the measured diameter based on detectors 318 and 322 at elevation angles of +45° and −45°, respectively, from beam axis 330, and where $\Delta d$ is the difference between $d_1$ and a second measurement $d_2$ based on detectors 320 and 322 at respective elevation angles of +45° and −25°. The largest error due to linear approximation varies from −0.007 μm to +0.014 μm for a cylinder diameter of 125 μm. This error corresponds to a deviation of −0.00 to +0.023 in the nominal refractive index of 1.4534.

To estimate the uncertainty caused by refractive index correction, equation (11) is written in the following form:

$$d = .8d_1 - 2.8d_2. \quad (12)$$

Assuming that random errors $\pm x$ can occur in $d_1$ and $d_2$, it is clear from equation (12) that these errors are cumulative if they have opposite signs for $d_1$ and $d_2$ for example, an error of $+x$ in $d_1$ and $-x$ in $d_2$ results in an error of $6.6x$ in diameter determination d.

If the measuring system is calibrated with cylinders of known diameter, the mean values of random errors are negligible. It is the variance of the random errors that is significant. The variances (squares of standard deviations) of random errors in the two individual terms on the right-hand side of equation (12) must be added to determine the variance of random error in d. If the standard deviations of errors in $d_1$ and $d_2$ are both given by $\delta$, the variances of the two terms in equation (12) are given by $(3.8\delta)^2$ and $(2.8\delta)^2$. Consequently, the standard deviation of random error in d is given as $$\sqrt{(3.8\delta^2) + (2.8\delta^2)} = 4.72\delta.$$

The increase from $\delta$ to 4.726 reflects the amplification of random errors.

The geometry of the sizing system, in particular the elevation angles of the photodetectors, plays a critical role in the extent to which the standard deviation is increased due to random errors. More particularly, in a system substantially identical to that in FIG. 13, but in which the elevation angles of the photodetectors are +60°, −60° and 15°, the pairs of signals used to generate phase shift values reflect a greater difference in elevation angles, i.e. 45° (120° less 75°) as opposed to 20° (90° less 70°). This difference is reflected in the phase shift values. In the system of FIG. 13, the ratio of $\Phi_1/\Phi_2$ is 0.85. In the alternative geometry, the ratio $\Phi_1/\Phi_2$ is 0.71. The greater difference between phase shift values diminishes random error amplification. More particularly, the alternative detector positioning yields a standard deviation of about $2\delta$, as compared to $4.72\delta$ of the system in FIG. 13.

Finally, it is not necessary that all three signals used for size and refractive index measurements originate from the light scattered by the fiber. As seen in FIG. 14, depicting an alternative embodiment of the sizing system, a reference signal can be provided to signal processor 324 in lieu of the output of one of detectors 318, 320 and 322. As shown, the reference signal can be derived from the electrical signal that drives Bragg cell 315. The signal path from the Bragg cell to the signal processor is indicated at 323.

Alternatively, a reference signal can be based on the unscattered direct light of beams 312 and 314. FIG. 15 shows a detector 321 positioned to receive unscattered light travelling in the z direction, beyond measuring volume 317.

Thus, in accordance with the present invention cylindrical objects can be characterized to a high degree of accuracy, even when moving at a high longitudinal velocity. This enables on-the-fly inspection of the fiber drawing processes, detection of highly localized irregularities and rapid action in response to sensing defects. Substantially more accurate diameter readings are obtained, with compensation for changes in refractive index due to temperature changes and other factors.

What is claimed is:

1. An apparatus for non-contact measurement of cylindrical objects; including a source of coherent energy and a beam forming means for generating two linearly propagating beams of the coherent energy;

a beam guide means for orienting the beams at a predetermined beam angle relative to one another to define a beam plane, said beams interfering with one another over a measuring region at their intersection;

a support means for positioning the beam plane with respect to a cylindrical object to cause the cylindrical object and the measuring region to intersect one another with a longitudinal axis of the cylindrical object substantially perpendicular to the beam plane, whereby the object scatters the coherent energy;

a detection means for providing first and second phase values based on detecting the scattered coherent energy at respective and different first and second locations spaced apart from the measuring region;

a means for providing a third phase value; and a processing means for combining each of the first and second phase values with the third phase value to generate respective first and second phase shift values, and for determining a transverse dimension of the cylindrical object and a property of the cylindrical object other than said transverse dimension, based on the first and second phase shift values.

2. The apparatus of claim 1 wherein:

said property of the cylindrical object is a refractive index of the object.

3. The apparatus of claim 1 wherein:

said detection means includes first and second energy detectors at said first and second locations for providing the first and second phase values respectively: and said means for providing the third phase value includes a third energy detector positioned to receive the coherent energy at a third location spaced apart from a measuring region and different from the first and second locations.

4. The apparatus of claim 3 wherein:

said first, second and third energy detectors all receive scattered coherent energy and have different elevation angles with respect to a beam axis bisecting the predetermined beam angle, and further are angularly positioned relative to one another, such that the first and second phase shift values have a ratio of at most 0.85.

5. The apparatus of claim 3 wherein:

said third energy detector means is positioned to collect unscattered coherent energy from said source of coherent energy.

6. The apparatus of claim 1 wherein:

the coherent energy is laser energy, and the beams are collimated at least in the region of their intersection.

7. The apparatus of claim 6 wherein:

the energy detecting means includes two photodetectors, positioned to intersect the beam plane and generating respective analog electrical outputs based on received scattered laser energy.

8. The apparatus of claim 1 further including:

a modulation means for shifting the frequency of one of the collimated beams by a predetermined amount.

9. The apparatus of claim 8 wherein:

said detection means includes first and second energy detectors positioned at said first and second locations respectively and generating the first and second phase values respectively as their outputs, and wherein said means for providing the third phase value includes a reference source.

10. The apparatus of claim 1 wherein:

the energy detectors are positioned angularly relative to one another, such that the first and second phase shift values have a ratio p greater than about 0.7 and less than 1.

11. The apparatus of claim 3 further including:

in combination with each of the first and second energy detectors: a high pass filter receiving the output of its associated energy detector, a mixing means for combining a reference frequency with the output of the high pass filter, and a low pass filter for receiving the output of the associated mixing means, the output of said low pass filter being the corresponding one of said periodic signals.

12. A process for characterizing a cylindrical object, comprising the steps of:

generating two linearly propagating beams of coherent energy, angularly separated from one another at a predetermined beam angle, and causing the beams to intersect one another to define a beam plane and to provide a measuring region at the intersection of the beams;

positioning the beam plane and measuring region with respect to a cylindrical object to cause the cylindrical object and the measuring region to intersect one another with a longitudinal axis of the cylindrical object substantially perpendicular to the beam plane, whereby the cylindrical object scatters the coherent energy;

detecting at least two distinct portions of the scattered coherent energy and, based on the detected energy, generating first and second periodic signals;

simultaneously generating a third periodic signal; and selectively combining the first, second and third periodic signals into first and second different pairs of the signals, generating respective first and second phase shift values based on the first and second signal pairs, and determining a transverse dimension of the object based on the first and second phase shift values.

13. The process of claim 12 including the further step of: determining a refractive index of the object based on the first and second phase shift values.

14. The process of claim 13 including the further step of: determining a characteristic of the cylindrical object based on the refractive index.

15. The process of claim 14 wherein: the characteristic is the temperature of the object.

16. The process of claim 15 wherein: said transverse dimension is the cylinder diameter, and said step of determining the cylinder diameter includes determining first and second diameter values based on the first and second phase shift values, respectively, and linearly combining the first and second diameter values to determine the diameter.

* * * * *

UNITED STATES PATENT AND TRADEMARK OFFICE
CERTIFICATE OF CORRECTION

PATENT NO. : 5,453,837
DATED : September 26, 1995
INVENTOR(S) : Amir A. Naqwi, et al It is certified that error appears in the above-indentified patent and that said Letters Patent is hereby corrected as shown below:

In column 16, claim 7, line 22 please delete "energy detecting" and insert -- detection --.

In column 16, claim 10, line 36 please delete "1" and insert -- 3 --.

Signed and Sealed this

Second Day of January, 1996

Attest:

BRUCE LEHMAN

Attesting Officer

Commissioner of Patents and Trademarks